United States Patent
Oelmann et al.

(10) Patent No.: US 12,362,672 B2
(45) Date of Patent: Jul. 15, 2025

(54) DIRECT-CURRENT-TO-DIRECT-CURRENT CONVERTER WITH COMPENSATION FOR POTENTIAL TRANSFORMER SATURATION

(71) Applicant: Deere & Company, Moline, IL (US)

(72) Inventors: Dustin E. Oelmann, Fargo, ND (US); Yuheng Wu, Fargo, ND (US); Richard E. Wainwright, West Fargo, ND (US)

(73) Assignee: Deere & Company, Moline, IL (US)

( * ) Notice: Subject to any disclaimer, the term of this patent is extended or adjusted under 35 U.S.C. 154(b) by 232 days.

(21) Appl. No.: 18/350,396

(22) Filed: Jul. 11, 2023

(65) Prior Publication Data

US 2024/0204669 A1  Jun. 20, 2024

Related U.S. Application Data

(60) Provisional application No. 63/476,096, filed on Dec. 19, 2022.

(51) Int. Cl.
*H02M 3/335* (2006.01)
*H02M 1/00* (2006.01)

(52) U.S. Cl.
CPC ..... *H02M 3/33515* (2013.01); *H02M 1/0025* (2021.05); *H02M 3/33584* (2013.01)

(58) Field of Classification Search
CPC .......... H02M 3/33515; H02M 1/0025; H02M 3/33584
See application file for complete search history.

(56) References Cited

U.S. PATENT DOCUMENTS

| | | | |
|---|---|---|---|
| 11,223,286 B2 | 1/2022 | Liang et al. | |
| 11,870,358 B2 * | 1/2024 | Rastogi | H02M 1/32 |
| 2014/0185328 A1 | 7/2014 | Rosado et al. | |
| 2014/0253109 A1 | 9/2014 | Singh et al. | |
| 2022/0239230 A1 | 7/2022 | Li et al. | |
| 2024/0204670 A1 * | 6/2024 | Wu | H02M 3/33523 |
| 2024/0204675 A1 * | 6/2024 | Wu | H02M 1/0058 |

(Continued)

FOREIGN PATENT DOCUMENTS

CN    112234833 A    1/2021

OTHER PUBLICATIONS

Extended European Search Report and Written Opinion issued in European Patent Application No. 23207789.1 dated Apr. 8, 2024, in 12 pages.

(Continued)

*Primary Examiner* — Adolf D Berhane

(57) ABSTRACT

An electronic controller is configured to adjust the duty cycle, between a respective pairs of semiconductor switches of the primary converter of a direct-current-to-direct-current converter based on reducing or minimizing one or more of the first estimated line-to-line DC offset voltage, the second estimated line-to-line DC offset voltage, and the third estimated line-to-line DC offset voltage. Further, the electronic controller is configured determines duty cycle adjustments based on reducing or minimizing one or more of the time-averaged magnitudes of, near DC low frequency AC components of the first estimated line-to-line DC offset voltage, the second estimated line-to-line DC offset voltage, and the third estimated line-to-line DC offset voltage.

13 Claims, 9 Drawing Sheets

(56) References Cited

U.S. PATENT DOCUMENTS

2024/0204677 A1* 6/2024 Wu ..................... H02M 1/327

OTHER PUBLICATIONS

Yao Pengfei et al., Flux Balancing Control of Ungapped Nanocrystalline Core-Based Transformer in Dual Active Bridge Converters, IEEE Transactions on Power Electronics, Institute of Electrical and Electronics Engineers, USA, vol. 35, No. 11, Apr. 3, 2020, pp. 11463-11474, [online], [retrieved on Jul. 28, 2020]. Retrieved from the Internet <URL: https://ieeexplore.ieee.org/stamp/stamp.jsp?tp=&arnumber=9056515>, ISSN: 0885-8993, DOI: 10.1109/TPEL.2020.2984789.

Voigtman et al., Low-pass filters for signal averaging, American Institute of Physics, pp. 957-966, Jan. 12, 1986, doi: 10.1063/1.1138645, [online]. Retrieved from the Internet <URL: https://pubs.aip.org/aip/rsi/article-abstract/57/5/957/313518/Low-pass-filters-for-signal-averagingSignal?redirectedFrom=fulltext>.

* cited by examiner

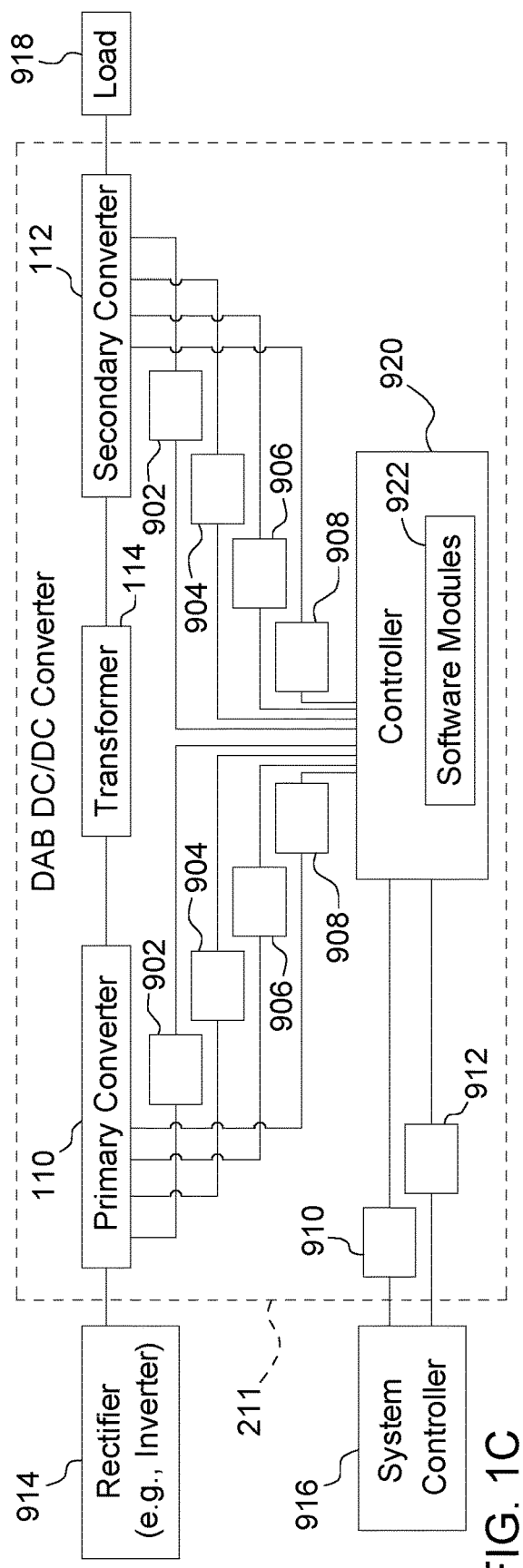
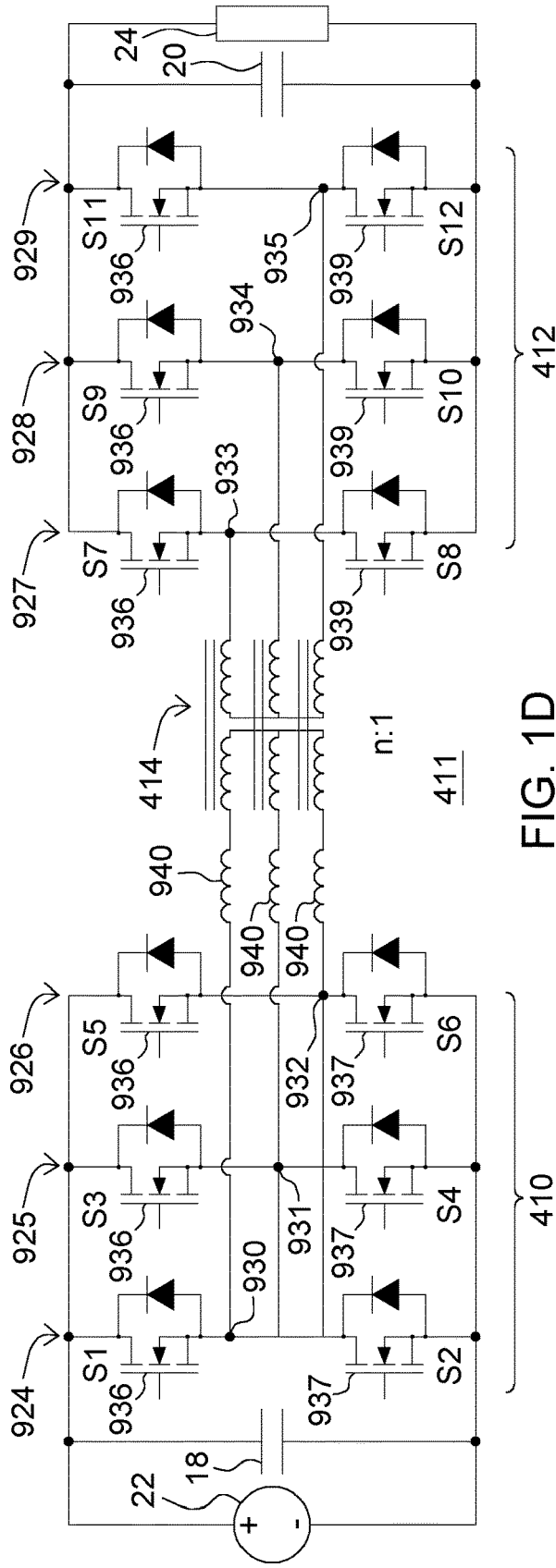
FIG. 1C
FIG. 1D

DIRECT-CURRENT-TO-DIRECT-CURRENT CONVERTER WITH COMPENSATION FOR POTENTIAL TRANSFORMER SATURATION

RELATED APPLICATION

This document (including the drawings) claims priority and the benefit of the filing date based on U.S. provisional application No. 63/476,096, filed Dec. 19, 2022, under 35 U.S.C. § 119 (e), where the provisional application is hereby incorporated by reference herein.

TECHNICAL FIELD

This disclosure related to a direct-current (DC)-to-direct-current (DC) converter with compensation for potential transformer saturation, such as duty-cycle compensation.

BACKGROUND

In some prior art, a transformer of a dual active bridge DC-to-DC converter may have a primary converter that is susceptible to introducing: (a) a specious DC voltage offset, or (b) a low frequency (e.g., near-DC) voltage offset/bias, or (c) both, to a winding (e.g., primary winding) in which a magnetizing current flows. During normal operation of the transformer, the magnetizing current induces a fluctuating magnetic field to flow in the core between the primary winding and the secondary winding and which efficiently produces induced current in one of the windings (e.g., secondary winding). However, in the presence of specious DC voltage offset, or a low frequency (e.g., near-DC) voltage offset/bias, or both, the magnetizing current tends to increase and the inductance of the (primary) winding tends to decrease inversely with respect to the magnetizing current. The magnetizing current can contribute to saturation of the magnetic flux of the transformer. For example, a specious DC voltage offset does not create a desired fluctuating electromagnetic field, but rather a static electromagnetic field that limits energy transfer of alternating current through transformer. In turn, the maximum power rating or maximum current transfer of the transformer can be vulnerable to reduction, or reduced, by the magnetizing current and induced current, which are dissipated as thermal energy in the transformer. Therefore, there is a need for a DC-to-DC converter with compensation for potential transformer saturation, such as duty-cycle compensation.

SUMMARY

In accordance with one aspect of the disclosure, a dual-active-bridge converter comprises a primary converter that has a plurality of primary switch pairs that operate at different phases or phase offsets with respect to each other. Each primary switch pair comprises a first switched terminal of low-side semiconductor switch that is coupled to a corresponding second switched terminal of high-side semiconductor switch at a primary alternating-current node. Each primary switch pair comprises the low-side semiconductor switch that has a second switched terminal coupled to one terminal of a primary direct-current bus. The high-side semiconductor switch has a first switched terminal coupled to another terminal of the primary direct-current bus.

A secondary converter has a plurality of secondary switch pairs that operate at different phases or phase offsets with respect to each other. Each secondary switch pair comprises a first switched terminal of low-side semiconductor switch that is coupled to a corresponding second switched terminal of high-side semiconductor switch at an secondary alternating-current node. Each secondary switch pair comprising the low-side semiconductor switch that has a second switched terminal coupled to one terminal of a secondary direct-current bus. The high-side semiconductor switch has a first switched terminal coupled to another terminal of the secondary direct current bus.

A first DC offset detector is configured to measure a first observed DC offset line-to-line voltage, associated with the primary alternating-current nodes, between a first respective phase and a second respective phase, wherein the first DC offset detector comprises a first preconditioner having a first low-pass filter for averaging over time or smoothing the magnitudes of near DC, low frequency alternating current components in the first observed DC offset line-to-line voltage. A second DC offset detector is configured to measure a second observed DC offset line-to-line voltage, associated with the primary alternating-current nodes, between a third respective phase and the second respective phase, wherein the first DC offset detector comprises a second preconditioner having a first low-pass filter for averaging over time or smoothing the magnitudes of near DC, low frequency alternating current components in the first observed DC offset line-to-line voltage.

A transformer coupled between the primary alternating-current node(s) and the secondary alternating-current node(s).

Under one aspect of the disclosure, an electronic controller is configured to provide control signals to the control terminals of the semiconductor switches of the primary converter and the secondary converter based on a commanded current or target output current. Further, the electronic controller is configured to adjust the duty cycle, between a respective pairs of semiconductor switches (e.g., pair comprising a low-side semiconductor switch and high-side semiconductor switch of the same phase) of the primary converter (e.g., and optionally the second converter) based on reducing or minimizing one or more of the time-averaged magnitudes of, near DC low frequency AC components of one or more of the first estimated line-to-line DC offset voltage, the second estimated line-to-line DC offset voltage, and the third estimated line-to-line DC offset voltage.

BRIEF DESCRIPTION OF THE DRAWINGS

FIG. 1C is a schematic diagram of yet another embodiment of a direct-current-to-direct-current converter that comprises a primary full-bridge converter coupled to a secondary full-bridge converter via a transformer.

FIG. 1D is a schematic diagram of still another embodiment of a direct-current-to-direct-current converter that comprises a primary full-bridge converter coupled to a secondary full-bridge converter via a transformer with three-phase windings.

Like reference numbers in any set or group of two or more drawings indicates like elements, features, steps or methods.

DETAILED DESCRIPTION

In any of the above referenced drawings of this document, any arrow or line that connects any blocks, components, modules, multiplexers, sensors, switches, diodes, memory, data storage, data processors, electronic components, oscillators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system and method disclosed in this document may comprise a computer-implemented system, method or converter in which one or more data processors process, store, retrieve, and otherwise manipulate data via data buses and one or more data storage devices (e.g., data storage device or memory) as described in this document and the accompanying drawings. As used in this document, "configured to, adapted to, or arranged to" mean that the data processor, converter or controller is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, "configured to, adapted to, or arranged to" can mean that the converter comprises one or more components described herein as software modules, equivalent electronic hardware modules, or both to execute any referenced functions, logic operations, mathematical operations, calculations, determinations, processes, methods, algorithms, subroutine.

Figure 1A:
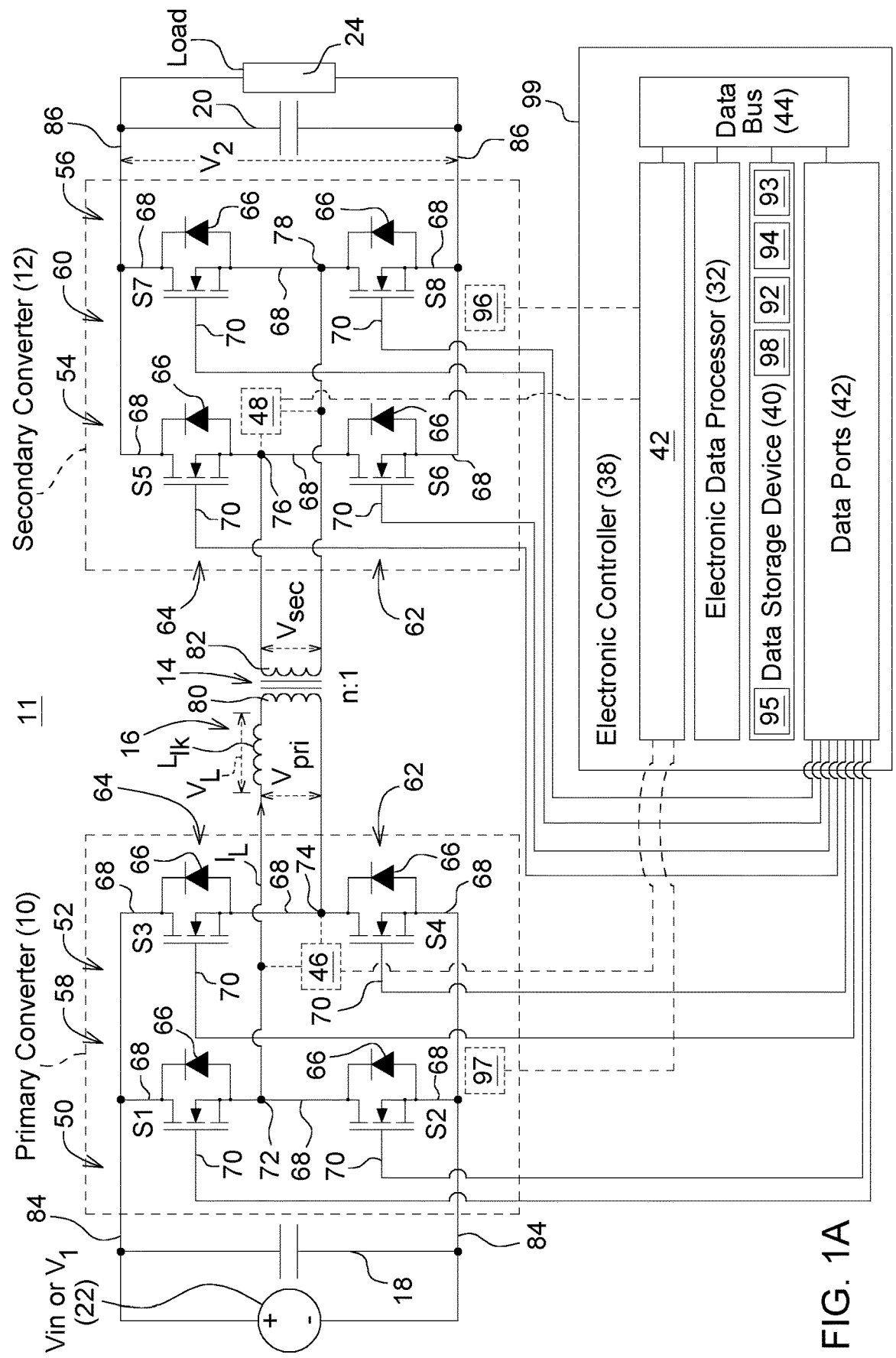
FIG. 1A is a schematic diagram of one embodiment of a direct-current-to-direct-current-converter that comprises a primary full-bridge converter coupled to a secondary full-bridge converter via a transformer.

In accordance with one embodiment, FIG. 1A illustrates a system of controlling a direct-current (DC) to direct-current (DC) converter for improved thermal efficiency. In FIG. 1A, a primary converter 10 comprises first pair 50 of primary switches and a second pair 52 of primary switches coupled between direct current input terminals 84 of the primary converter 10. A secondary converter 12 comprises a first pair 54 of secondary switches and second pair 56 of secondary switches coupled between direct current output terminals 86 of the secondary converter. A transformer 14 (e.g., isolation transformer) is coupled between the primary converter 10 and the secondary converter 12. A primary winding 80 of the transformer 14 is coupled to output terminals of the first pair 50 and second pair 52 of primary switches and secondary winding 82 of the transformer 14 is coupled to output terminals of the secondary switches 60. A load 24 (e.g., direct-current load) is arranged for coupling to the direct current output terminals 86; wherein an electronic controller 38 is configured to provide time-synchronized control signals to the control terminals of the primary switches 58 and secondary switches 60 to control the converter 11 or system to operate at a modulation frequency (e.g., pulse width modulation frequency).

In one embodiment, one or more voltage measurement devices (46, 48) are configured to measure an observed input voltage and observed output voltage to determine an operational load ratio or operational load percentage between the observed power transfer and maximum power transfer. Because the measurement devices (46, 48) are optional in some configurations, the measurement devices are illustrated in dashed lines.

In one configuration, an electronic data processor 32 or electronic controller 38 is configured to select a load curve based on the determined operational load ratio or percentage. Further, the electronic data processor 32 or electronic controller 38 is configured to adjust or maintain the modulation frequency (e.g., pulse width modulation (PWM)) of the primary converter 10 and the secondary converter 12 consistent with an operation point on the selected load curve, where the operation point minimizes the power loss or thermal energy dissipated from the direct-current-to-direct current converter 11.

FIG. 1A is a schematic diagram of one embodiment of a direct-current-to-direct-current converter 11 ("DC-to-DC converter" or "DC-DC converter") that comprises a primary full bridge 10 coupled to a secondary full bridge 12 via a transformer 14. A primary full bridge 10 comprises first pair 50 of primary switches and a second pair 52 of primary switches. The first pair 50 of primary switches is coupled between direct current (DC) primary terminals 84 (e.g., input terminals) of the primary full bridge 10; the second pair 52 of primary switches 58 is coupled between DC primary terminals 84 (e.g., input terminals) of the primary full bridge 10. The first pair 52 and second pair 58 of primary switches may be referred to as an H-bridge.

In one embodiment, the DC-to-DC converter 11 comprises a single phase, dual-active bridge DC-to-DC converter with DC primary terminals 84 (e.g., DC input terminals) at the primary full bridge 10 and DC secondary terminals 86 (e.g., DC output terminals) at the secondary full bridge 12, where the DC-to-DC converter 11 may operate unidirectionally or bidirectionally (e.g., to transfer electrical power or energy from the input to the output of the converter 11, or vice versa).

Each pair of primary switches 58 comprises a low-side switch 62 and a high-side switch 64. Similarly, each pair of secondary switches 60 comprises a low-side switch 62 and a high-side switch 64. Each switch (58, 60) has switched terminals 68 that are controlled by a control terminal 70. For example, if the switch is a field effect transistor, such as a metal oxide semiconductor field effect transistor (MOSFET) (e.g., Silicon Carbide MOSFET), the switched terminals 68 comprise a source and drain terminal and the control terminal 70 comprises a gate terminal. In one configuration, for each pair of primary switches 58, the switched terminals 68 of the low-side switch 62 are coupled in series to the switched terminals 68 of the high-side switch 64 between the DC primary terminals 84. As illustrated in FIG. 1A, each switch has a protective diode 66 coupled in parallel to the switched terminals 68 of the respective switch. In one embodiment, the switches (58, 60) may comprise silicon devices, silicon carbide field effect transistors, or any suitable conventional semiconductor devices or wide-band-gap semiconductor devices.

In the primary full bridge 10, the switched terminals 68 of the first pair 50 of low-side switch 62 and the high-side switch 64 are coupled together at a first node 72 or first junction associated with a primary alternating current signal. In the primary full bridge 10, the switched terminals 68 of the second pair 52 of low-side switch 62 and the high-side switch 64 are coupled together at a second node 74 or second junction associated with the primary alternating current signal.

A secondary full bridge 12 comprises a third pair 54 of switches (e.g., secondary switches 60) and a fourth pair 56 of switches (e.g., secondary switches 60) coupled between DC secondary terminals 86 (e.g., output terminals) of the secondary full bridge 12. The third pair 54 of switches (e.g., secondary switches 60) is coupled between direct current secondary terminals (e.g., output terminals) of the secondary full bridge 12; the fourth pair 56 of switches (e.g., secondary switches 60) is coupled between DC secondary terminals 86 (e.g., output terminals) of the secondary full bridge 12.

Each pair of secondary switches 60 comprises a low-side switch 62 and a high side switch 64. Each secondary switch 60 has switched terminals 68 that are controlled by a control terminal 70. For example, if the switch is a field effect transistor, such as a metal oxide semiconductor field effect transistor (MOSFET) (e.g., silicon carbide MOSFET devices), the switched terminals 68 comprise a source and drain terminal and the control terminal 70 comprises a gate terminal. As illustrated in FIG. 1A, each secondary switch 60 has a protective diode 66 coupled in parallel to the switched terminals 68 of the respective switch.

In the DC-to-DC converter 11 in one illustrative configuration, each diode 66 facilitates current dissipation associated with the respective switch (58, 60), to which the diode 66 is coupled in parallel, to reduce transient voltages across the switch (e.g., during a prior turn-off, prior deactivation or prior dead-time of the switch in preparation) for the next turning on of the switch, or next activating of the switch (58, 60). In one embodiment, the protective diodes 66 may be composed gallium nitride diodes or other semiconductor materials.

In the secondary full bridge 12, the switched terminals 68 of the third pair 54 of low-side switch 62 and the high-side switch 64 are coupled together at a third node 76 or third junction associated with a secondary alternating current signal. In the secondary full bridge 12, the switched terminals 68 of the fourth pair 56 of low-side switch 62 and the high-side switch 64 are coupled together at a fourth node 78 or fourth junction associated with the secondary alternating current signal.

In one embodiment, a transformer 14 is coupled between the primary full bridge 10 and the secondary full bridge 12. For example, a primary winding 80 of the transformer 14 is coupled to a first node 72 (e.g., first output terminal) of the first pair 50 and the second node 74 (e.g., second output terminal) of second pair 52 of primary switches 58. Similarly, a secondary winding 82 of the transformer 14 is coupled to a third node 76 (e.g., third output terminal) of the third pair 54 and a fourth node 78 (e.g., fourth output terminal) of the fourth pair 56 of switches (e.g., secondary switches 60).

The transformer 14 has at least one primary winding 80 and at least one secondary winding 82, where a transformer 14 ratio (n) represents a voltage ratio between the primary terminals and the secondary terminals, or between the primary winding and the secondary winding. For example, the primary winding 80 ratio may represent the number of relative turns (n) of the primary winding 80 to the secondary winding 82. The voltage ratio or winding ratio (turn ratio) may depend upon the winding configuration, the conductor configuration, and the configuration of any core, such as ferromagnetic core, a ferrite core, or an iron core.

In one embodiment, an inductor or variable inductor 16 is coupled in series with the primary winding 80 of the transformer. In an alternate embodiment, the variable inductor is associated with a set of discrete inductors that can be connected, via a set of switches, in series, in a parallel, or both, to achieve an adjustable aggregate inductance. For example, the controller 38 or data processor 32 can control or adjust the variable inductor, or its associated switches, to tune the transformer 14 for the target modulation frequency (e.g., of a pulse width modulation (PWM) signal) to minimize power loss, power difference or thermal dissipation of the converter 11.

Figure 1B:
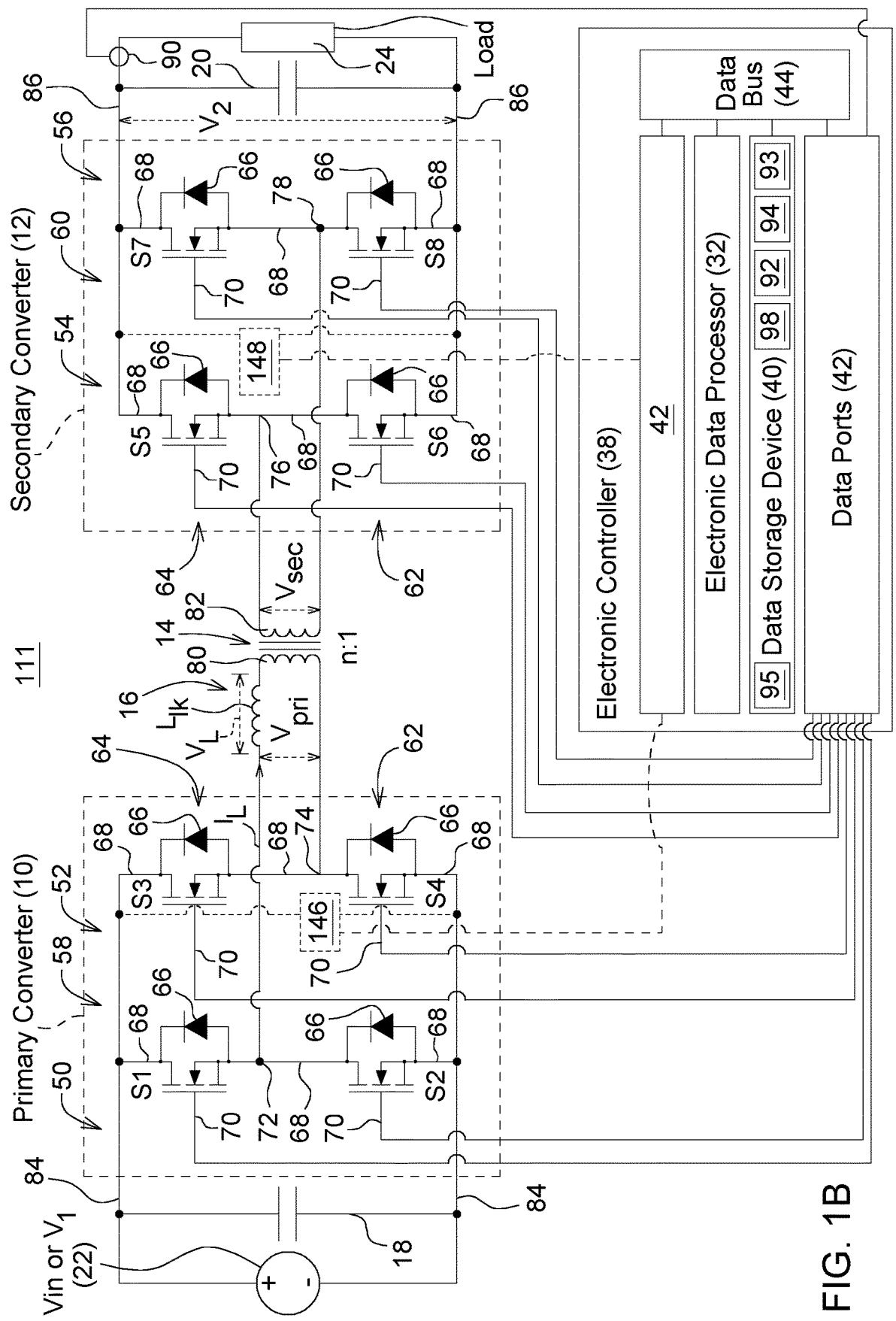
FIG. 1B is a schematic diagram of another embodiment of a direct-current-to-direct-current-converter that comprises a primary full-bridge converter coupled to a secondary full-bridge converter via a transformer.

Although an inductor or variable inductor 16 is coupled (e.g., selectively or switchably) in series with the primary winding 80 of the transformer 14, as illustrated in FIG. 1A and in FIG. 1B, to facilitate efficient power transfer from the primary winding 80 to the secondary winding 82; in an alternate embodiment, an auxiliary inductor or variable inductor is coupled (e.g., selectively or switchably) in series with the secondary winding 82 of the transformer (14, 114, 414) for efficient power transfer from the secondary winding to the primary winding of the transformer (14, 114, 414).

In another alternate embodiment, a discrete inductor or variable inductor 16 can be replaced by or the leakage inductance of the transformer (14, 114, 414) by intentionally introducing additional leakage inductance by way of one or more of the following: (a) by adding a gap in the transformer core, (b) by changing the winding configuration of the primary winding, the secondary winding or both, or (c) by changing the core geometry in some way as to induce a controlled leakage inductance.

An energy source 22 (e.g., battery, capacitor, or generator output) is coupled to the direct current (DC) primary terminals 84 (e.g., input terminals). A load 24 (e.g., active or passive load) is configured to be coupled to the direct current (DC) secondary terminals 86 (e.g., output terminals). However, the DC-to-DC converter 11 that comprises the primary full bridge 10, the secondary full bridge 12 and the transformer 14 can operate bi-directionally, such as where the electrical energy is transferred in either direction between the DC primary terminals 84 and the DC secondary terminals 86. In one direction, the energy source 22 at the DC primary terminals 84 can power a load 24 at the DC secondary terminals 86. However, in the opposite direction, the load 24 at the DC secondary terminals 86 can provide excess or transient energy to the DC primary terminals 84 to charge the energy source 22. As illustrated, a capacitor, such as a primary capacitor 18 is placed across the DC primary terminals 84 and a secondary capacitor 20 is placed across the DC secondary terminals 86, where the primary capacitor 18 and the secondary capacitor 20 are used for filtering (e.g., to reduce noise, such as voltage ripple in the DC voltage).

In certain embodiments, the DC primary terminals 84 are configured to operate at a different voltage level than the DC secondary terminals 86. In other embodiments, the DC primary terminals 84, the DC secondary voltage levels can have variable voltage levels that can fluctuate with the load 24 or operating conditions on a dynamic basis for each time interval (e.g., sampling time of DC voltage observed at the DC primary input and DC secondary output terminals of the converter). For example, the DC primary terminals 84 operate at a higher voltage level or higher voltage range (e.g., approximately 400 VDC to approximately 800 VDC) than a lower voltage level or lower voltage range (e.g., approximately 12 VDC to approximately 400 VDC) the DC secondary terminals 86. Accordingly, the electronic assembly or DC-to-DC converter 11 supports a vehicle with different DC bus levels that are isolated from each other because the transformer blocks DC energy from passing through between transformer primary and transformer secondary.

In one embodiment, an electronic data processor 32, such as an electronic controller 38, is configured to provide time-synchronized control signals to the control terminals 70 of the primary switches 58 and secondary switches 60 to control the converter 11 to operate efficiently in a first control mode 26, a second control mode 28, or a third control mode 30 (in FIG. 1A and FIG. 1B), wherein the first control mode 26 comprises a phase-shift mode, the second control mode 28 comprises a triangular waveform control mode and wherein the third control mode 30 comprises a trapezoidal waveform control mode.

In one embodiment, an electronic controller 38 comprises an electronic data processor 32, a data storage device 40, and one or more data ports 42 coupled to or in communication with a data bus 44. The electronic data processor 32, the data storage device 40, and one or more data ports 42 may communicate data messages between each other via the data bus 44. The electronic data processor 32 is capable of executing or processing any software instructions or software modules stored in the data storage device 40.

The electronic data processor comprises a microcontroller, a microprocessor, a programmable logic array, a logic device, an arithmetic logic unit, a digital signal processor, an application specific integrated circuit, a system on a chip, a system on a module, or another device for processing or manipulating data. The data storage device comprises electronic memory, nonvolatile random-access memory, magnetic storage device, an optical storage device, or another device for storing, retrieving and managing data, files, data structures or data records. The data ports may comprise an input/output port, a data transceiver, a wireline transceiver, a wireless transceiver, buffer memory, or a combination of the foregoing items.

In one embodiment, the electronic data processor 32 or its data ports 42 are connected to or in communication with the control terminals 70 of the switches (e.g., primary switches 58 and the secondary switches 60) of the primary full bridge 10 and the secondary full bridge 12. Accordingly, the electronic controller 38 can control the timing and operation of each switch, such as activation time, deactivation time, biasing and other aspects. In one embodiment, the electronic controller 38 or electronic data processor 32 uses a fixed switching frequency of fundamental frequency (e.g., within an operational range of switching frequencies) of the switches for multiple or all modulation modes, such as the first mode, the second mode and the third mode. Further, the switches can operate with a same or substantially similar fixed duty cycle (e.g., 50 percent duty cycle plus or minus ten percent tolerance) for multiple or all modulation modes, such as the first mode, the second mode and the third mode. In some configurations, the peak magnitude and duration of the gate signal of the high-side switch 64 and low-side switch 62 of any pair or phase will generally be equal or substantially equivalent.

Although the DC primary terminals 84 (e.g., DC primary bus) and the DC secondary terminals 86 (e.g., DC secondary bus) have fixed voltage levels, the primary voltage (V1) at (or across) the transformer primary winding 80, or the secondary voltage (V2) at (or across) the transformer secondary winding 82, or both can vary.

In one embodiment, a first voltage sensor 46 (e.g., primary voltage sensor) is configured to measure the primary voltage (e.g., root-mean-squared voltage, peak voltage or other alternating current voltage measurement) and a second voltage sensor 48 (e.g., secondary voltage sensor) is configured to: (a) measure the observed primary and secondary voltages (e.g., root-mean-squared voltage, peak voltage or other alternating current voltage measurement) and (b) provide the measurements observed voltage readings of the primary voltage and secondary voltage (e.g., at the transformer terminals of the primary winding and secondary winding) to the electronic controller 38 via one or more data ports 42. In another embodiment, the first voltage sensor 46 and the second voltage sensor 48 may measure one or more of the following: alternating current (AC) voltage levels, root-mean-squared (RMS) voltage levels, or rectified alternating current (e.g., via a half-wave or full-wave bridge rectifier) at one or more transformer windings (80, 82). Further, the electronic controller 38 or electronic data processor 32 is configured to estimate the DC primary voltage at the DC primary input terminals 84 and the DC secondary voltage at the DC secondary output terminals 86 of the converter 11 based on the measurements, or can control the switches in an initialization mode or test mode to facilitate direct measurement of the primary voltage at the DC primary input terminals 84 and the secondary voltage at the DC secondary output terminals 86 of the converter.

Alternately, (e.g., during initialization mode or operational mode) the first voltage sensor 146 (in FIG. 1B) and the second voltage sensor 148 (in FIG. 1B) are configured to: (a) measure the primary voltage at the DC primary input terminals 84 and the secondary voltage at the DC secondary output terminals 86 of the converter 11, and (b) provide the measurements to the electronic controller 38 via one or more data ports 42. Accordingly, the observed primary voltage and the observed secondary voltage can be or are applied to one or more transferred power equations that apply to the respective control mode to estimate the maximum transferred power for each control mod, among other things.

Figure 4:
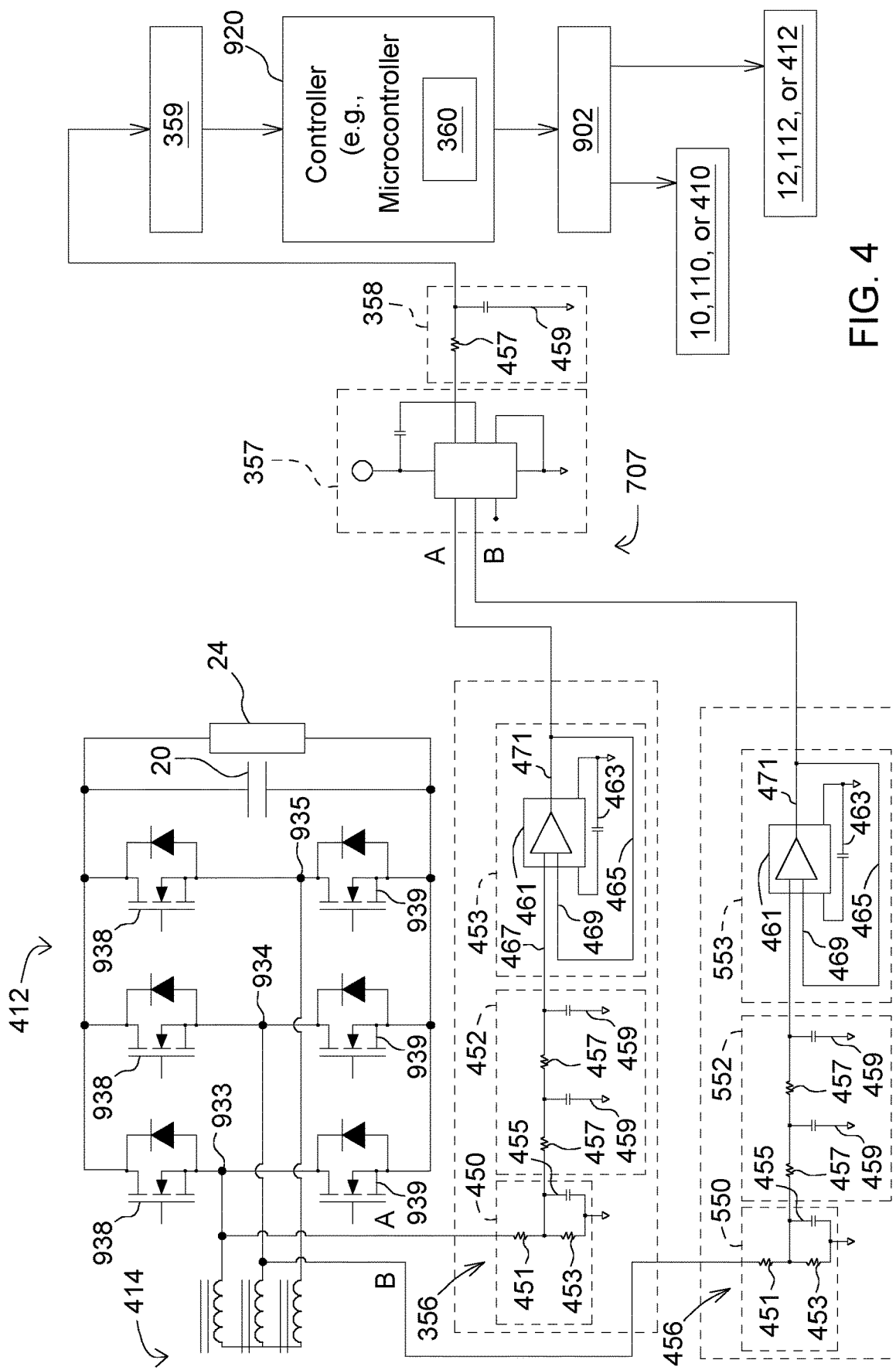
FIG. 4 is a schematic diagram comprising one embodiment of a preconditioner (e.g., preconditioning stage) that is coupled to two alternating-current nodes of a secondary converter (e.g., secondary full-bridge converter), where differential amplifier is used to amplify a difference between two phases of alternating current.

FIG. 1B is similar to FIG. 1A, except the first voltage sensor 46 and the second voltage sensor 48 of FIG. 1A are replaced by the first voltage sensor 146 and the second voltage sensor 148 of FIG. 1B. For example, the readings by a first voltage sensor 146 and a second voltage sensor 148 can be applied to the equations set forth in this document that call for the DC primary voltage (V1 or Vin) at terminals 84 or DC secondary voltage (V2 or Vout) at terminals 86, where Vin and Vout are illustrated in FIG. 4. In an alternate embodiment, the first voltage sensor 146 or the second voltage sensor 148 may be omitted if the DC primary voltage (V1) is fixed or regulated within a certain tolerance and the second voltage sensor 148 may be omitted if the DC secondary voltage (V2) is fixed or regulated within a certain tolerance (e.g., in accordance with design-specifications).

FIG. 1C is a block diagram of one embodiment of a direct-current-to-direct-current converter 211 that comprises a primary full bridge converter 110 coupled to a secondary full bridge converter 112 via a transformer 114. Like reference numbers in FIG. 1B and FIG. 1C indicate like elements or features.

In FIG. 1C, the dual-active bridge DC-DC converter 211 comprises a primary converter 110 and a secondary converter 112 coupled to a transformer 114. The input of the primary converter 110 may be associated with an energy source, such as a battery pack, an ultracapacitor, or a rectifier 914 (e.g., bidirectional inverter) that rectifies alternating current power generated by an electric machine (e.g., alternator), or from the electrical grid. The secondary output of the secondary converter 112 is coupled to a load 918.

In FIG. 1C, an electronic controller 920 is coupled to the primary converter 110 and the secondary converter 112. The electronic controller 920 has one or more software modules 922, such as a duty-cycle control module 93, a current measurement module 92, a voltage measurement module 94, and a temperature compensation module 95, and a driver 98, which are described in conjunction with FIG. 1A and FIG. 1B. The duty-cycle control module 93 may comprise a line-to-line voltage estimator (e.g., DC offset detector) and duty-cycle control module 93. Any observed line-to-line DC voltage offset may comprise an observed low-frequency line-to-line voltage bias or an observed near-DC, low frequency AC line-to-line voltage bias.

The controller 920 is configured to store a look-up table (LUT), a file, an inverted file, a data base or another suitable data structure 360 with charts, graphs, data records, rules or equations that define a relationship between respective observed or measured line-to-line voltages (e.g., between any two alternating-current phases) and corresponding, compensating duty cycle adjustments for each phase of the DC-to-DC converter 211.

In one embodiment, the primary converter (10, 110, 410) comprises a (gate or switch) driver (98, 902) and one or more of the following sensors: a temperature sensor (96, 904), a voltage sensor (46, 146, 906) and a current sensor (90, 908). Meanwhile, the secondary converter (12, 112, 412) comprises a (gate or switch) driver (98, 902) and one or more of the following sensors: a temperature sensor (97, 904), a voltage sensor (48, 148, 906), and a current sensor (90, 908).

The electronic controller 920 is coupled to a system controller 916 that can communicate via a vehicle data bus 910 (e.g., controller area network (CAN) data bus) and a battery management system data bus 912.

FIG. 1D is a schematic diagram of another embodiment of a direct-current-to-direct-current converter 411 that comprises a primary full-bridge converter 410 coupled to a secondary full-bridge converter 412 via a transformer 414 with three-phase windings. The DC-to-DC converter 411 of FIG. 1D is similar to the DC-to-DC converter (11, 111) of FIG. 1A and FIG. 1B that featured a single-phase converter (10, 110) (e.g., a single phase dual active bridge converter), a two-phase secondary converter (12, 112), and a transformer (14, 114), except the DC-DC converter 411 of FIG. 1D has a three-phase primary converter 410, a three phase secondary converter 412 and transformer 414 with three-phase windings.

In FIG. 1D, the DC terminals of the primary converter 410 are coupled to the primary capacitor 18 and an energy source 22, such as a battery. Each phase (924, 925, 926) of primary converter 410 comprises pair of a low-side semiconductor switch 937 and a high-side semiconductor switch 936. For example, the first phase 924 comprises the pair of semiconductor switches (S1 and S2); the second phase 925 comprises the pair of semiconductor switches (S3 and S4); the third phase 926 comprises the pair of semiconductor switches (S5 and S6). The primary converter 410 has three primary alternating-current (AC) phase nodes or AC terminals (930, 931, 932). Each AC phase node is coupled to the primary windings of the transformer 414 via integral inductances 940 (e.g., leakage inductances or similar discrete inductors). In certain embodiments, the integrate inductances 940 are suitable to facilitate the transfer of energy from the primary converter 410 to the secondary converter 412; henceforth, to the load 24.

The secondary AC phase nodes (933, 934, 935) of the secondary converter 412 (e.g., rectifier) are coupled to respective pairs of low-side semiconductor switches 939 and high-side semiconductor switches 938. For example, the first phase 927 comprises the pair of semiconductor switches (S7 and S8); the second phase 928 comprises the pair of semiconductor switches (S9 and S10); the third phase 929 comprises the pair of semiconductor switches (S11 and S12). The DC terminals of the secondary converter 412 are coupled to the secondary capacitor 20 and the load 24. The electronic controller of FIG. 1A, FIG. 1B, or FIG. 1C can be configured to or adapted to provide control signals to the control terminals of all three phases of the semiconductor switches of FIG. 1D.

Figure 2:
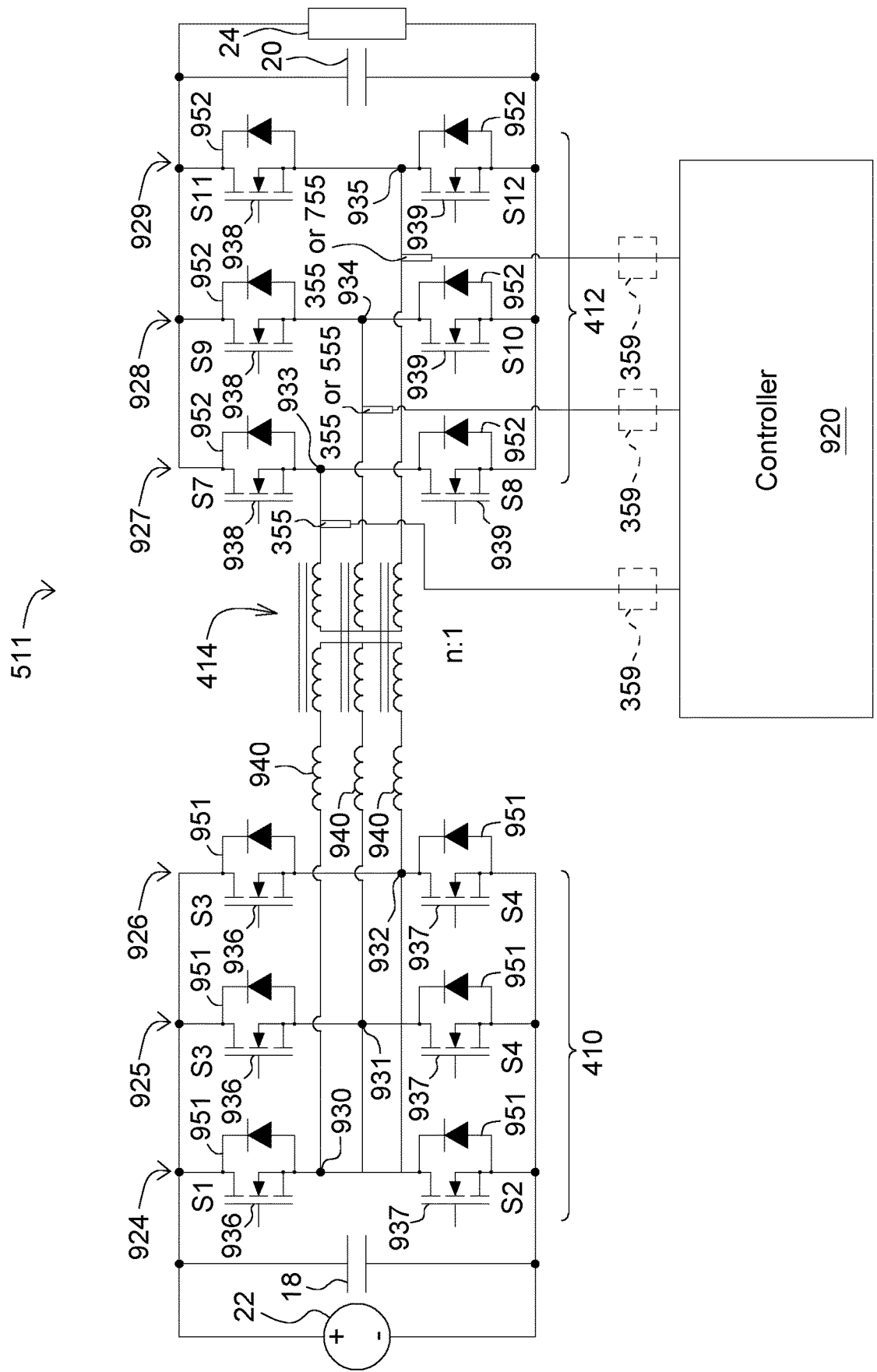
FIG. 2 is a schematic diagram of one embodiment of a primary converter of a DC-to-DC converter that illustrates the measurement of alternating-current voltage outputs at respective alternating-current output nodes.
Figure 3:
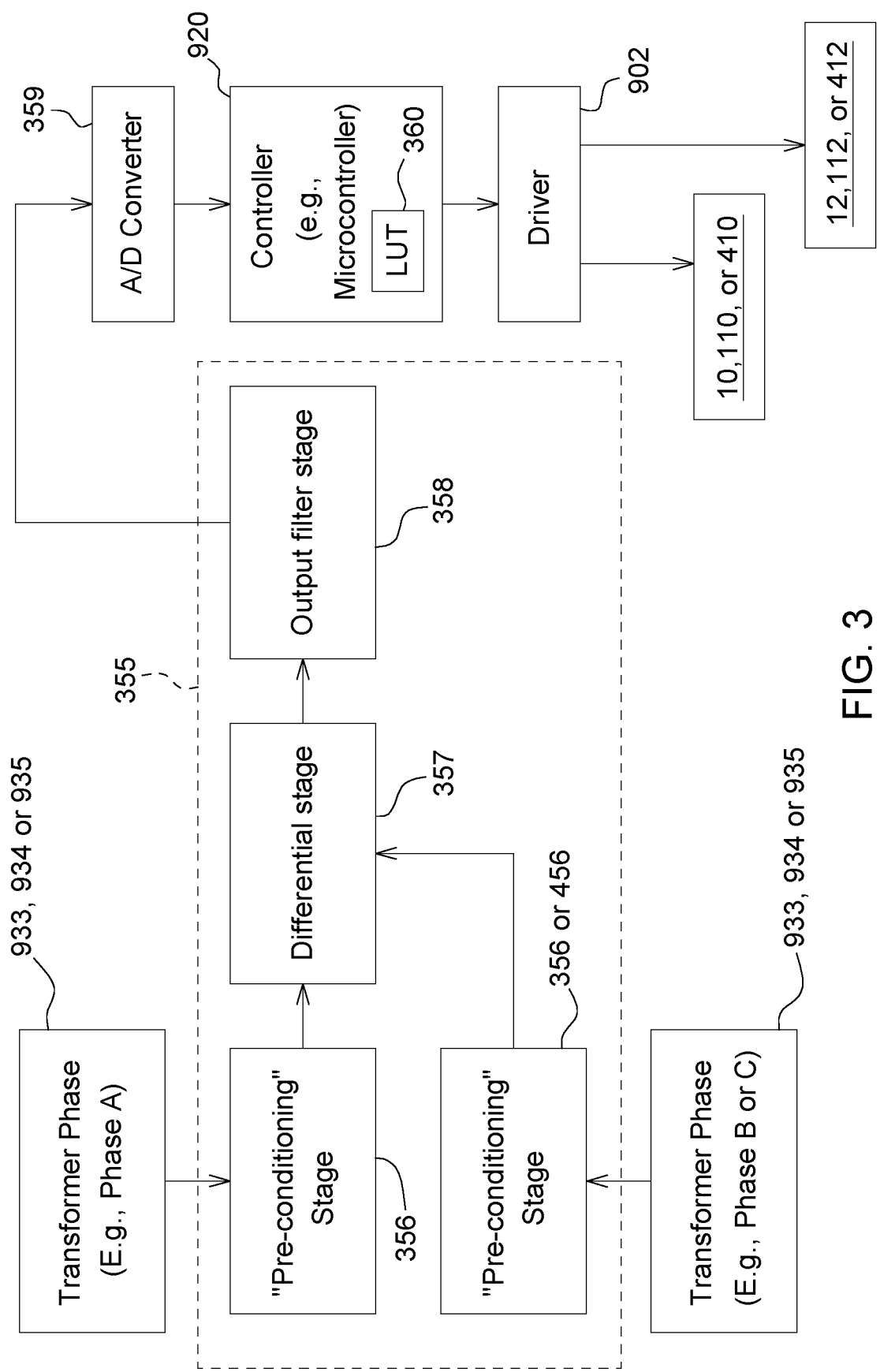
FIG. 3 is a block diagram of one embodiment of a DC offset detector for determining one illustrative or exemplary line-to-line voltage of the DC-to-DC converter that is coupled to a controller and a driver for driving switches of the DC-to-DC converter.

FIG. 2 is a schematic diagram of another embodiment of a direct-current-to-direct-current converter 511 that comprises a primary full-bridge converter 410 coupled to a secondary full-bridge converter 412 via a transformer 414 with three-phase windings. The DC-to-DC converter 511 of FIG. 2 is similar that the DC-to-DC converter 411, except the DC-to-DC converter 511 of FIG. 2 further includes a controller 920 that is coupled to the secondary AC nodes (933, 934, 935) of the secondary converter 412, where the controller 920 may feature one or more DC offset detectors 355 as illustrated in FIG. 3. As illustrated, the DC offset detectors (355, 555, 755) measure the DC offset or low frequency alternating current components at the secondary AC nodes. The DC offset detectors (355, 555, 755) are configured to measure respective observed line-to-line DC voltage offsets, where each observed line-to-line DC voltage offset may comprise an observed low-frequency, line-to-line voltage bias or an observed near-DC, low frequency AC line-to-line voltage bias that is between two phases, where the observed line-to-line DC voltage offset between phase A and phase B is designated near-DC alternating-current bias component AB, where the observed line-to-line DC voltage offset between phase B and phase C is designated near-DC alternating-current bias component BC; and where the observed line-to-line DC voltage offset between phase A and phase C is designated near-DC alternating-current bias component AC. Like elements in FIG. 1D and FIG. 2, indicate like elements or features.

FIG. 2 is a schematic of one embodiment of a primary converter 511 of a DC-to-DC converter that illustrates the alternating-current voltage outputs at respective alternating-current output nodes (930, 931, 932). The first alternating-current voltage 301 for the first phase or phase A is measured relative to the negative DC bus; the second alternating-current voltage 302 for the second phase or phase B is measured relative to the negative DC bus; the third-alternating current voltage 315 for the third phase or phase C is measured relative to the negative DC bus. The high-side switches 936 have switched terminals coupled to the positive DC bus terminal and the low-side switches 937 have switched terminals coupled to the negative DC bus terminal. The high-side switches 936 receive control signals (e.g., PWM signals with compensating pulse width adjustments to reduce or cancel DC voltage error or DC offset voltage, or near-DC offset voltage) at control terminals 947. The low-side switches 937 receive control signals (e.g., PWM signals with compensating pulse width adjustments to reduce or cancel DC voltage error or DC offset voltage, or near-DC offset voltage) at control terminals 948.

FIG. 2 is a schematic of one embodiment of a primary converter 410 of a DC-to-DC converter that illustrates the alternating-current voltage outputs at respective alternating-current output nodes (930, 931, 932). The first alternating-current voltage for the first phase is referred to as phase A (930) relative to the negative DC bus (e.g., negative DC bus); the second alternating-current voltage for the second phase is referred to as phase B (931) relative to the negative DC bus (e.g., negative DC bus); the third-alternating current voltage for the third phase is referred to as phase C (932) relative to the negative DC bus (e.g., negative DC bus). The high-side switches 936 have switched terminals (e.g., drains or collectors) coupled to the positive DC bus terminal and the low-side switches 937 have switched terminals (e.g., sources or emitters) coupled to the negative DC bus terminal. The high-side switches 936 receive control signals (e.g., PWM signals with compensating pulse width adjustments to reduce or cancel DC voltage error or DC offset voltage, or near-DC offset voltage) at control terminals 947. The low-side switches 937 receive control signals (e.g., PWM signals with compensating pulse width adjustments to reduce or cancel DC voltage error or DC offset voltage, or near-DC offset voltage) at control terminals 948.

Duty Cycle Adjustment or Management

In accordance with one aspect of the disclosure, a dual-active-bridge converter comprises a primary converter (10, 110, 410) that has a plurality of primary switch pairs (68, 936, 937, 939) that operate at different phases or phase offsets (e.g., two phase operates at approximately 180 degrees offset, whereas a three phases operate at approximately 120 degrees offsets) with respect to each other. Each primary switch pair comprises a first switched terminal (e.g., drain or collector) of low-side semiconductor switch (S2, S4, S6) that is coupled to a corresponding second switched terminal (e.g., source or emitter) of high-side semiconductor switch (S1, S3, S5) at a primary alternating current node (930, 931, 932). Each primary switch pair comprises the low-side semiconductor switch (S2, S4, S6) that has a second switched terminal (e.g., source or emitter coupled to one terminal of a primary direct current bus (e.g., 84)). The high-side semiconductor switch (S1, S3, S5) has a first switched terminal (e.g., drain or collector) coupled to another terminal (e.g., positive DC terminal) of the primary direct current bus (e.g., 84).

A secondary converter (12, 112, 412) has a plurality of secondary switch pairs that operate at different phases or phase offsets with respect to each other. Each secondary switch pair comprises a first switched terminal (e.g., drain or collector) of low-side semiconductor switch (S8, S10, S12) that is coupled to a corresponding second switched terminal (e.g., source or emitter) of high-side semiconductor switch (S7, S9, S11) at an secondary alternating current node. Each secondary switch pair comprises the low-side semiconductor switch (S8, S10, S12) that has a second switched terminal (e.g., source or emitter) coupled to one terminal of a secondary direct current bus (e.g., 86). The high-side semiconductor switch (S7, S9, S11) has a first switched terminal (e.g., drain or collector) coupled to another terminal (e.g., positive DC terminal) of the secondary direct current bus (e.g., 86).

For a DC-DC converter (11, 111), a voltage measurement module 94 comprises a first DC offset detector 355. In one embodiment, a first DC offset detector 355 is configured to measure a first observed DC offset line-to-line voltage, associated with the primary alternating current nodes (72, 74 in FIG. 1B), between a respective first phase and a respective second phase. The first DC offset detector 355 comprises a first preconditioner 356 (e.g., preconditioning stage) which has a first low-pass filter for averaging over time or smoothing the magnitudes of near DC, low frequency alternating current components (e.g., approximately 0 Hz to approximately 45 Hz) in the first observed DC offset line-to-line voltage.

In FIG. 3, the DC-to-DC offset detector 355 can support a three-phase DC-to-DC converter 411. Accordingly the three-phase DC-to-DC converter 411 may comprise a first DC offset detector 355, a second DC offset detector and a third DC offset detector. For instance, the first DC offset detector 355 is configured to measure a first observed DC offset line-to-line voltage, associated with the primary alternating current nodes (933, 934 in FIG. 1D and FIG. 2), between a respective first phase 933 (e.g., phase A) and a respective second phase 934 (e.g., phase B).

In one embodiment, a second DC offset detector 355 is configured to measure a second observed DC offset line-to-line voltage, associated with the primary alternating-current nodes, between the respective second phase 934 (e.g., phase B) and a respective third phase 935 (e.g., phase C). The second DC offset detector 355 comprises a second preconditioner 356, which has a second low-pass filter for averaging over time or smoothing the magnitudes of near DC, low frequency alternating current components (e.g., approximately 0 Hz to approximately 45 Hz) in the second observed DC offset line-to-line voltage.

In one embodiment, a third DC offset detector 355 is configured to measure a third observed DC offset line-to-line voltage, associated with the primary alternating-current nodes, between the respective first phase 933 (e.g., phase A) and a respective third phase 935 (e.g., phase C). The third DC offset detector 355 comprises a third preconditioner 356, which has a third low-pass filter for averaging over time or smoothing the magnitudes of near DC, low frequency alternating current components (e.g., approximately 0 Hz to approximately 45 Hz) in the third observed DC offset line-to-line voltage.

A transformer (14, 114, 414) is coupled between each primary alternating-current node (e.g., 930, 931, 932) and a corresponding secondary alternating current node (e.g., 933, 934, 935). The transformer (14, 114, 414) may have one or more primary windings that correspond to an equal number of secondary windings. In one example, in one configuration (e.g., one-phase configuration) the transformer may comprise single primary winding and a single secondary winding in electromagnetic communication with the respective primary winding; the primary winding is associated with two corresponding primary alternating-current nodes (72, 74 in FIG. 1A and FIG. 1B) and the secondary winding is associated with two corresponding secondary alternating-current nodes (76, 78). In yet another example, in one configuration (e.g., two-phase configuration) the transformer may comprise two primary windings and two secondary windings in electromagnetic communication with the respective primary windings; the two primary windings are associated with multiple corresponding primary alternating-current nodes and the two secondary windings are associated with multiple corresponding secondary alternating-current nodes. In still another example, in a three-phase configuration the transformer 414 may comprise three primary windings and three corresponding secondary windings in electromagnetic communication with the respective primary windings; the three primary windings are associated with three corresponding primary alternating-current nodes (930, 931, 932) and the three secondary windings are associated with three corresponding secondary alternating current nodes (e.g., 933, 934, 935). In the three-phase configuration, the first phase is referred to as phase A, the second phase is referred to as phase B and the third phase is referred to as phase C. In an alternate configuration, the transformer has six AC terminals wherein three of the six terminals are connected in either a "Wye" or "Delta" configuration to support a three-phase system.

In one embodiment, for a DC-to-DC converter (11, 111), an electronic controller 38 is configured to provide control signals to the control terminals (e.g., gates or bases) of the semiconductor switches of the primary converter 10 and the secondary converter 12 based on a commanded current or target output current; the electronic controller 38 configured to adjust the duty cycle through a duty cycle adjustment, between a respective pairs of semiconductor switches (e.g., a first pair of S1 and S2; second pair of S3 and S4; third pair of S5 and S6; fourth pair of S7 and S8) of the primary converter 10 and second converter 12 based on reducing or minimizing one or more of the time-averaged magnitudes of, near DC low frequency AC components in first estimated line-to-line DC offset voltage and the second estimated line-to-line DC offset voltage.

In one embodiment, for a three-phase DC-to-DC converter 411 the electronic controller (920) is configured to provide control signals to the control terminals of the semiconductor switches of the primary converter and the secondary converter based on a commanded current or target output current. Further, the electronic controller 920 is configured to adjust the duty cycle, between a respective pairs of semiconductor switches (e.g., pair comprising a low-side semiconductor switch and high-side semiconductor switch of the same phase) of the primary converter 410 (e.g., and optionally the second converter 412) based on reducing or minimizing one or more of the time-averaged magnitudes of, near DC low frequency AC components (e.g., within a frequency range of approximately 0 Hertz to approximately 45 Hertz) in the first estimated line-to-line DC offset voltage, the second estimated line-to-line DC offset voltage, and the third estimated line-to-line DC offset voltage.

In FIG. 4, in one embodiment, within each preconditioner 356, the first low-pass filter 452 comprises a second-order or third-order low-pass filter (e.g., heavy filtering of near-DC alternating components, while tending to pass AC components within a target-energy transfer, AC band of approximately 50 Hertz to 100 Hertz or more); the second low-pass filter 552 comprises a second-order or third-order low pass filter. Further, each cut-off frequency of the first low pass filter 452 and the second low pass filter 552 are equal to or less than approximately 45 Hertz. As used throughout this document and the appended claims, a near DC, low frequency alternating current components means within a range of approximately 0 Hz to approximately 45 Hz. As illustrated in FIG. 4, the first low-pass filter 452 and the second low-pass filter 242 each comprise a second-order resistor-capacitor (RC) low-pass filter, or a two-stage, cascaded RC filter. The Laplace transfer function for an nth order RC low-pass filter with identical resistance and capacitance for each stage is as follows:

$$H(s) = \frac{1}{(1+sRC)^n},$$

where R is the resistance (e.g., in Ohms) of each cascaded resistor, C is the capacitance of each cascaded capacitor, n is the order of the filter, and $s=\omega=2\pi f$.

To the extent that resistance of resistor 457 and capacitance of capacitor 459 are identical for each stage, the cutoff frequency equals approximately: $\omega=1/RC$, where R (457) is the resistance (e.g., in Ohms) of each cascaded resistor, C (459) is the capacitance of each cascaded capacitor, and $\omega$ is the cutoff frequency in radians per second and $\omega=2\pi f$, where f is frequency in Hertz. The peak attenuation for a cascaded second order filter at higher frequencies above the cutoff frequency may approach negative 80 decibels (dB), for example.

In an alternate embodiment, the passive second-order RC filter may be replaced by an active filter, such as an active first-order filter, an active second-order filter, or an active third-order filter. For example, in a voltage-follower configuration, a positive input terminal of operational amplifier may be coupled to the output of a first-order RC filter, where a feedback capacitor is coupled between the output terminal of the operational amplifier and the input terminal of the first-order RC filter. For example, the voltage follower configuration of the operational amplifier can provide approximately unity gain in the passband below the cut-off frequency. However, if necessary, the voltage follower may be configured to have a gain (e.g., by adding negative feedback resistors to the operational amplifier) to amplify the observed near-DC component and DC component of the voltages observed or measured at the AC phase nodes.

In another alternate embodiment, the passive second-order RC filter may be replaced by a second-order or third order digital filter, such as an infinite impulse response filter, a finite impulse response filter, or a hybrid of an infinite impulse response filter and finite impulse response filter, where the filter may comprise a combination of delay lines or shift registers, summers, and multipliers, where the inputs to the multipliers are coefficients can be adjusted to tune the filter response. For example, an infinite impulse response filter can be used for smoothing and averaging of the observed near-DC low frequency AC components in accordance with the following transfer function:

$$H(t) = \frac{1}{1 - a_1 z^{-1} - a_2 z^{-1}}$$

where t is function of time, which can be expressed in accordance with sampling periods, $a_1$ is first filter coefficient inputted to a first multiplier, $a_2$ is a second filter coefficient input to a second filter, and $z^{-1}$ is a unit time delay of one sampling period, based on a Z transform.

As illustrated in FIG. 4, in one embodiment the first preconditioner 356 comprises a first voltage divider 450, a first low-pass filter 452 and a first voltage follower stage 453 to prepare or condition the observed signals for combining (e.g., subtraction), amplification or processing by the first differential amplifier 357. The first voltage divider 450 is coupled to a corresponding alternating-current node 933

(e.g., phase A). The first voltage divider 450 reduces the voltage input from the alternating-current node for input to the first low pass filter 452. For example, at low frequencies where the capacitance of capacitor 455 can be ignored, the first voltage divider 450 reduces the voltage at the alternating-current node by a ratio of R1/R1+R2, where resistor 451 represents R1 and where resistor 453 represents R2. However, at high frequencies the capacitance adds reactance to R2 such that the voltage reduction is increased at higher frequencies. The first voltage divider 450 may be configured to scale or reduce the voltage to appropriate voltage ranges for subsequent interaction or processing by compact, low voltage electronic or electrical components that are commercially available.

Similarly, the second preconditioner 456 comprises a second voltage divider 550, a second low-pass filter 552 and a second voltage follower stage 553 to prepare or condition the observed signals for combining (e.g., subtraction), amplification or processing by the second differential amplifier 657. The second voltage divider 550 is coupled to a corresponding alternating-current node 934 (e.g., phase B). The second voltage divider 550 reduces the voltage input from the alternating-current node for input to the second low pass filter 552. For example, at low frequencies where the capacitance of capacitor 455 can be ignored, the second voltage divider 550 reduces the voltage at the alternating-current node by a ratio of R1/R1+R2, where resistor 451 represents R1 and where resistor 453 represents R2. However, at high frequencies the capacitance adds reactance to R2 such that the voltage reduction is increased at higher frequencies. The second voltage divider 550 may be configured to scale or reduce the voltage to appropriate voltage ranges for subsequent interaction or processing by compact, low voltage electronic or electrical components that are commercially available.

In FIG. 4, a first voltage follower stage 453 coupled to the respective first low-pass filter 452; the second preconditioner (356 or 456) comprises a second voltage follower stage 553 coupled to the respective second low-pass filter 552. In the first DC offset detector 355, a first differential amplifier 357 is coupled to the first voltage follower stage 453 and the second voltage follower stage 453. Each differential amplifier (357, 657, 957) supports combining (e.g., subtracting), in real time, the measurements of DC voltage components or near-DC voltage components of two phases into a single signal (e.g., observed line-to-line DC offset voltage), prior to the data processing delay associated with one or more electronic data processors of the controller (38, 920). The DC voltage components and near-DC voltage components are scaled down by the voltage divider (450, 550, 650) to voltage levels that are readily processed by the differential amplifier (357, 657, 957), which could be more challenging if sensed DC current components and near-DC current components were used.

In an alternate embodiment, the differential amplifier could be replaced by a differential calculation module in the electronic data processor 32 of the electronic controller (38, 920) that can require additional data processing capacity and throughput for timely performance.

A voltage follower stage (453, 553) has a high input impedance for any low-pass filter (452, 552) of this disclosure, to avoid loading of the filter (452, 552) that might otherwise interfere with, perturb or distort the performance of the filter 452, such as its averaging or smoothing performance, or capability of attenuating alternating current components, its magnitude versus frequency response, or its phase versus frequency response. Each voltage follower stage (453, 553) has a positive voltage input 467 and a negative voltage input 469 to an amplifier 461 (e.g., operational amplifier), where the negative voltage input is coupled to the output voltage terminal 471. The output impedance of the voltage follower (453, 553) tends to be low or lower than the input impedance with a unity gain or low gain between the positive input voltage terminal 467 and the output voltage terminal 471.

In an alternate embodiment, the voltage follower may be structured as an integrator by using a feedback capacitor between the voltage input terminal 467 and voltage output terminal 471 and an optional series resistor following the low-pass filter to feed the positive input voltage terminal 467.

In FIG. 4, following the first preconditioner 356, in one configuration, a supplemental low-pass filter 358 is coupled to an output of the first differential amplifier 357 to attenuate noise and alternating-current ripple in the first estimated line-to-line DC offset voltage. In other words, the first analog-to-digital converter 359 is coupled to an output of the first differential amplifier 357 via the supplemental low-pass filter 358. The differential amplifier 357 subtracts the DC components or low-frequency AC components of two phases, such as the first phase (phase A) and the second phase (phase B) to provide a first estimate line-to-line DC offset voltage or a first differential line-to-line voltage.

The electronic controller (38, 920) is configured to receive the digital output of the first analog-to-digital converter 359, directly or indirectly via a sample and hold module, a data buffer, a flip-flop, or a data stack. For example, the electronic controller (38, 920) determines and processes duty cycle adjustments based on an A/D sampling of averaged or smoothed representation, by a second or third order low pass filter of the first estimated line-to-line DC offset voltage, the second estimated line-to-line DC offset voltage, and the third estimated line-to-line DC offset voltage to drive the above DC-line-to-line voltages toward zero to reduce or eliminate the near-DC low frequency current components through the transformer (14, 114, 414). The second-order filter may provide greater sensor bandwidth and control bandwidth than a third-order filter, although a third order filter tends to provide greater attenuation of the AC ripple in the DC output of the DC-to-DC converter.

In this document, any low-pass filter (452, 552, 358) may be evaluated based on any of the following specifications or parameters: (a) maximizing attenuation outside the passband frequency range in the magnitude versus frequency response, (b) maintaining uniform phase or group delay versus frequency response within the passband, (c) a suitably low settling time at fixed noise bandwidth to achieve steady state attenuation, where its noise bandwidth represents an undesired signal within the useful frequency band or passband of a filter, and (d) after reaching steady-state conditions, the ability to smooth or time-average the magnitudes of the near-DC alternating frequency components over one or more sampling intervals (e.g., of the A/D converter or the digital processing of the electronic data processor (38, 920)).

In an alternate embodiment, alone or together with the above embodiments, the near-DC current in the transformer may be measured by using an auxiliary winding (e.g., primary winding) and associated tap terminal in conjunction with a current-sensing resistor placed in series with a high impedance dummy load to develop AC and near-DC voltage across the current-sensing resistor that is proportional to the AC and near-DC current, where the AC component can be rejected or attenuated by a filter (e.g., digital filter) tuned to reject the fundamental switching frequency of the primary switches and/or secondary switches of the DC-to-DC converter. For one or more sampling intervals, the magnitude of the near-DC current component could be provided alone, or together with the above observed line-to-line DC voltage offsets, to the electronic controller for generating compensating duty-cycle adjustments. However, the above alternate embodiment could require potentially additional space on any circuit boards associated with the alternate DC-to-DC controller, along with an alternate transformer with an auxiliary winding and respective taps.

Figure 5:
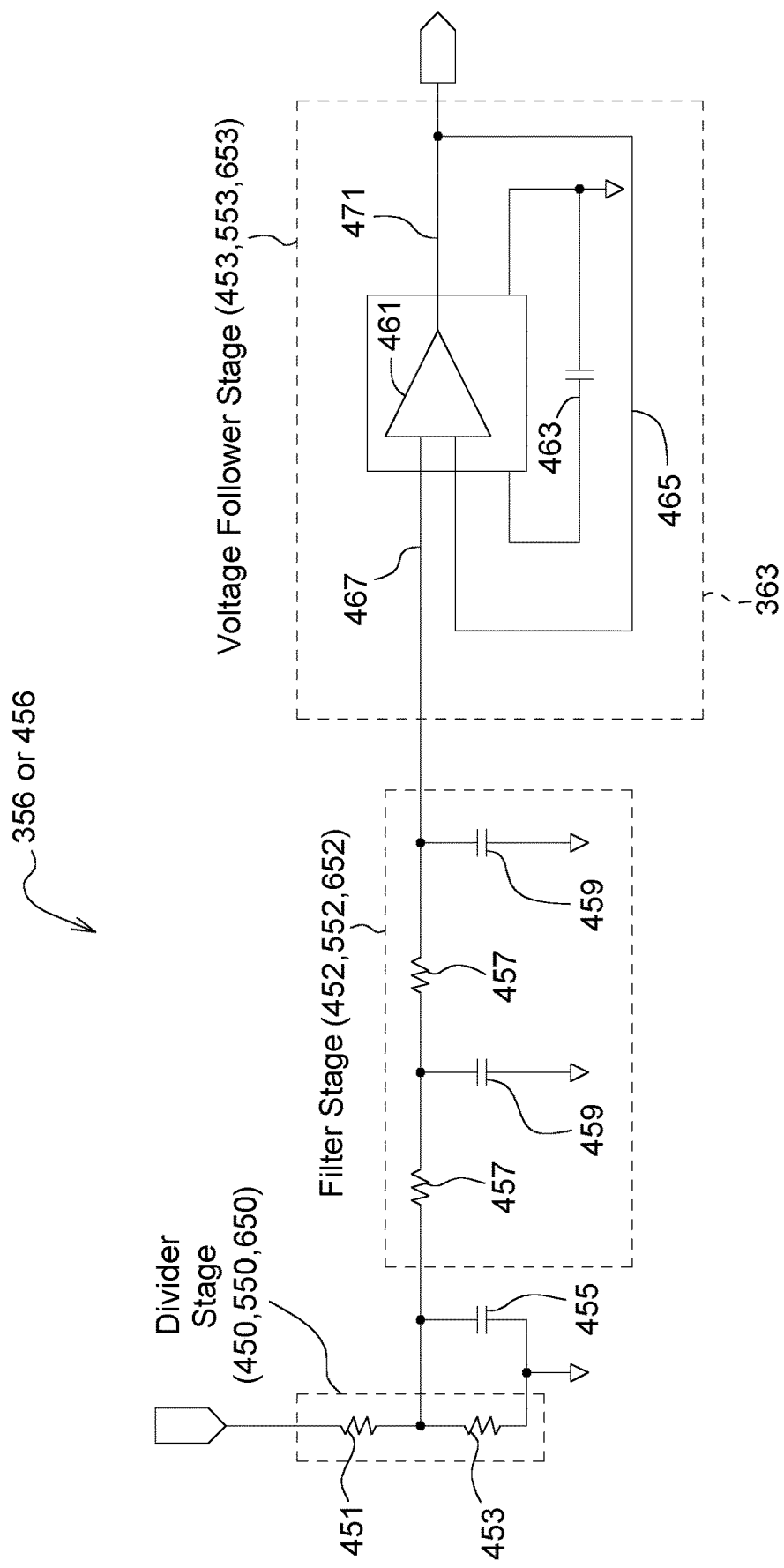
FIG. 5 is schematic diagram of one embodiment of a preconditioner that comprises a divider stage, a filter and a voltage follower stage.
Figure 6:
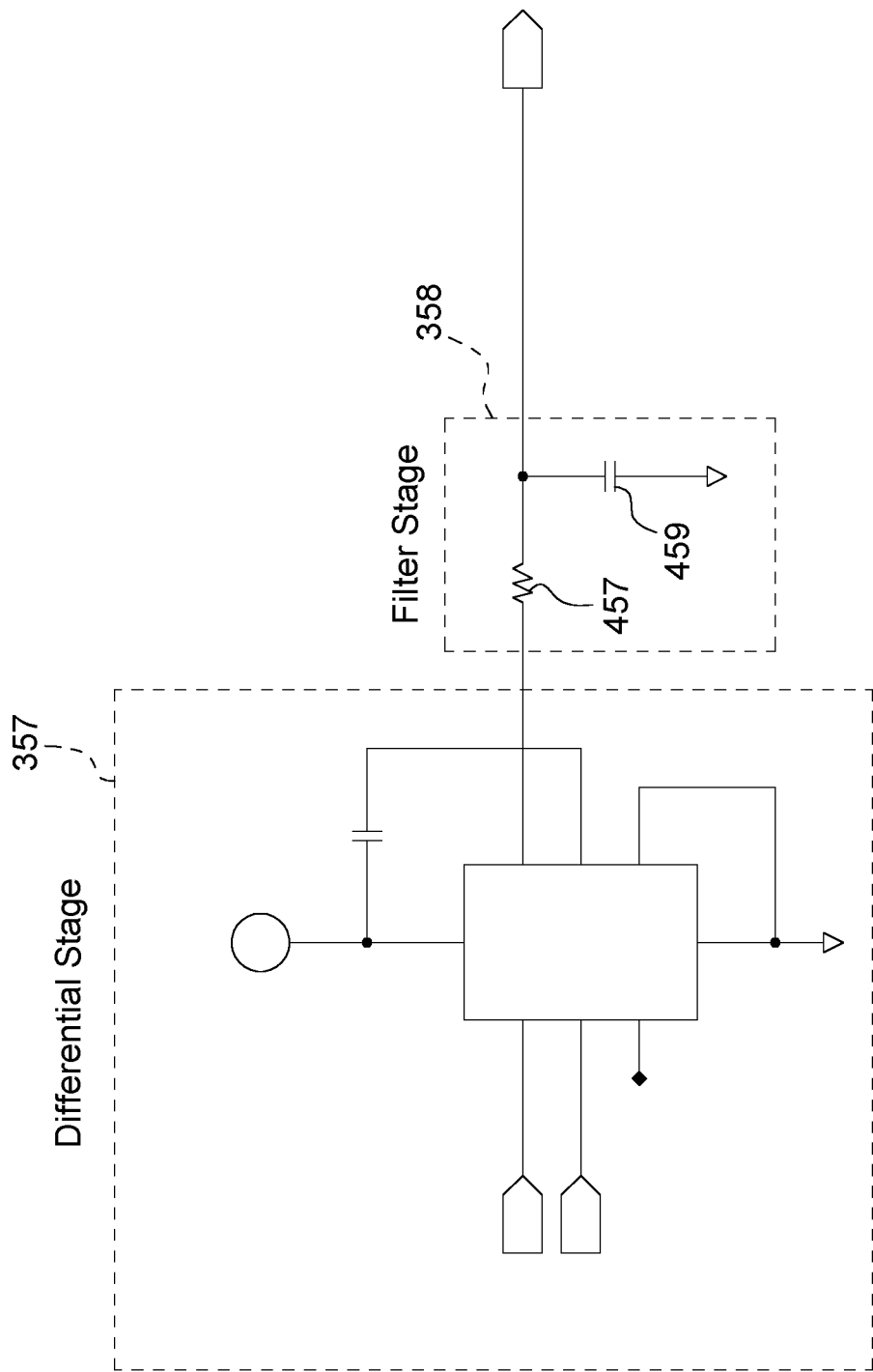
FIG. 6 is a schematic diagram of one embodiment of a portion of the DC offset detector comprising a differential amplifier and filter.

The schematic diagrams of FIG. 5 and FIG. 6 represent enlarged portions of FIG. 4, where like reference numbers indicate like elements or features in FIG. 4, FIG. 5 and FIG. 6.

Figure 7:
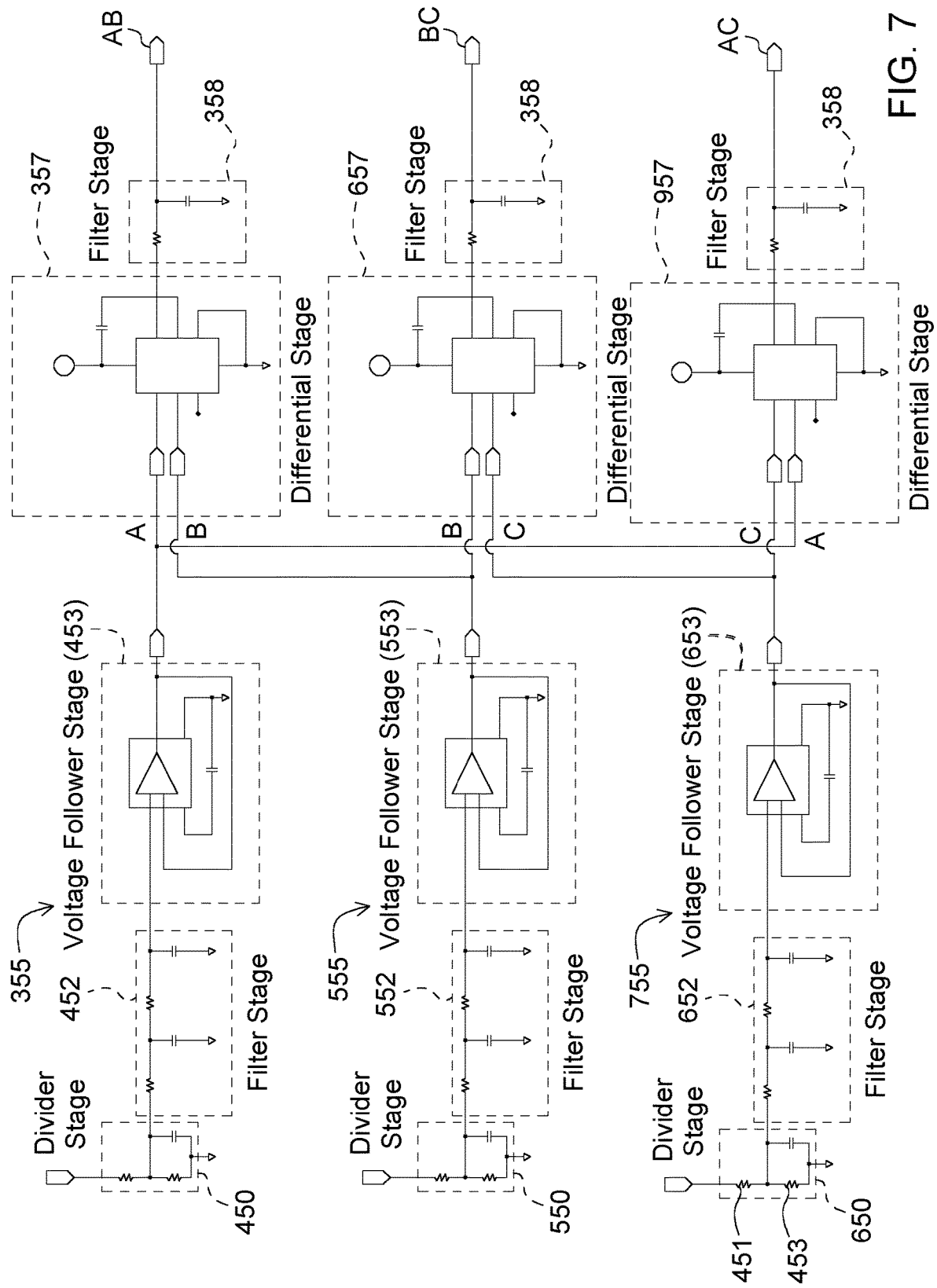
FIG. 7 is a schematic diagram of one possible embodiment of three DC offset detectors associated with a three-phase DC-to-DC converter.

FIG. 7 is a schematic diagram of one possible embodiment of three DC offset detectors (355, 555, 755) associated with a three-phase DC-to-DC converter, such as a first DC-offset detector 355, a second DC offset detector 555, and a third DC offset detector 755. Each DC offset detector (355, 555, 755) may share two preconditioners, whereas each DC offset detector has is own corresponding differential stage (357, 657, 957) and supplemental low-pass filter.

The DC-to-DC converter may comprise a second DC offset detector 555. The second DC offset detector 555 has, shares or uses a second low-pass filter 552 and third low-pass filter 652. The second low-pass filter 552 is configured to receive the second alternating current voltage at a second alternating current node 934 for a second respective phase (phase B). The third low-pass filter 652 is configured to receive the third alternating current voltage a third alternating current node 935 for a third respective phase (phase C). The second low-pass filter 552 and the third low-pass filter 652 are similar to the first low-pass filter 452 and the second low-pass filter 552 of the first DC offset detector 355. In one embodiment, the second low-pass filter 552 comprises a second-order or third-order low-pass filter; the third low-pass filter 652 comprises a second-order or third-order low pass filter. Further, each cut-off frequency of the second low-pass filter 552 and the third low-pass filter 652 are equal to or less than approximately 45 Hertz.

In one embodiment, a second voltage follower stage 553 is coupled to an output of the respective second low-pass filter 552. A third voltage follower stage 653 is coupled to an output of the respective third low-pass filter 652. A second differential amplifier 657 is coupled to the outputs of the second low-pass filter 552 and the third low-pass filter 652 via the respective voltage follower stages (553, 653). The second differential amplifier 657 is configured to provide the second line-to-line DC offset voltage (e.g., after filtering by the optional supplement low-pass filter 658.) The second differential amplifier 657 subtracts the DC components or low-frequency AC components of two phases, such as the second phase (phase B) and the third phase (phase C) to provide a second estimated line-to-line DC offset voltage or a second differential line-to-line voltage.

As illustrated, a supplemental low-pass filter 658 is coupled to an output of the second differential amplifier 657 to attenuate noise and alternating-current ripple in the second estimated line-to-line DC offset voltage. A second analog-to-digital converter coupled to an output of the supplemental low-pass filter 657. The electronic controller (38, 920) is configured to receive the digital output of the second analog-to-digital converter.

In one embodiment, in the context of a three-phase DC-to-DC converter, a third DC offset detector 755 is used. A third DC offset detector 755 is configured to measure a third observed DC offset line-to-line voltage associated with the primary alternating current nodes between the respective first phase (phase A) and the respective third phase (phase C). The transformer 411 is coupled between the primary alternating-current nodes and corresponding secondary alternating-current nodes.

The DC-to-DC converter may comprise a third DC offset detector 755. The third DC offset detector 755 has, shares or uses a first low-pass filter 452 and third low-pass filter 652. The first low-pass filter 452 is configured to receive the first alternating current voltage at a first alternating current node 933 for a second respective phase (phase A). The third low-pass filter 652 is configured to receive the third alternating current voltage a third alternating current node 935 for a third respective phase (phase C). The first low-pass filter 452 and the third low-pass filter 652 are similar to the first low-pass filter 452 and the second low-pass filter 552 of the first DC offset detector 355. In one embodiment, the first low-pass filter 452 comprises a second-order or third-order low-pass filter; the third low-pass filter 652 comprises a second-order or third-order low pass filter. Further, each cut-off frequency of the first low-pass filter 452 and the third low-pass filter 652 are equal to or less than approximately 45 Hertz.

In one embodiment, a first voltage follower stage 453 is coupled to an output of the respective first low-pass filter 452. A third voltage follower stage 653 is coupled to an output of the respective third low-pass filter 652. Collectively, the third preconditioner comprises the third voltage divider 650, the third low-pass filter 652 and the third follower stage 653 to prepare or condition the observed signals for combining (e.g., subtraction), amplification or processing by the third differential amplifier 957. The third voltage divider 650 may be configured to scale or reduce the voltage to appropriate voltage ranges for subsequent interaction or processing by compact, low voltage electronic or electrical components that are commercially available.

A third differential amplifier 957 is coupled to the outputs of the first low-pass filter 452 and the third low-pass filter 652 via the respective voltage follower stages (453, 653). The third differential amplifier 957 is configured to provide the third line-to-line DC offset voltage (e.g., after filtering by the optional supplement low-pass filter 958.) The third differential amplifier 957 subtracts the DC components or low-frequency AC components of two phases, such as the first phase (phase A) and the third phase (phase C) to provide a third estimated line-to-line DC offset voltage or a third differential line-to-line voltage.

As illustrated, a supplemental low-pass filter 958 is coupled to an output of the third differential amplifier 957 to attenuate noise and alternating-current ripple in the second estimated line-to-line DC offset voltage. A third analog-to-digital converter coupled to an output of the supplemental low-pass filter 958 The electronic controller (38, 920) is configured to receive the digital output of the second analog-to-digital converter.

The electronic controller (38, 920) configured to adjust the duty cycle through a duty cycle adjustment, between a respective pairs of semiconductor switches of the primary converter and second converter based on reducing or minimizing one or more of the time-averaged magnitudes of, near DC low frequency AC components in first estimated line-to-line DC offset voltage, the second estimated line-to-line DC offset voltage and third estimated line-to-line DC offset voltage.

The electronic controller, the electronic data processor, or the duty-cycle control module is configured to dynamically adjust the duty-cycle of pairs of low-side semiconductors and high-side semiconductors via a driver in accordance with various techniques, which may be applied separately or cumulatively.

Under a first technique, the electronic controller comprises a duty-cycle control module configured to adjust dynamically for one or more sampling intervals the duty cycle from a baseline duty cycle of approximately fifty percent by a maximum adjustment limit based on reducing or minimizing one or more of the, time-averaged magnitudes of, near DC low frequency AC components in the sampled first estimated line-to-line DC offset voltage and the sampled second estimated line-to-line DC offset voltage.

Under a second technique, the electronic controller comprises a duty-cycle control module configured to adjust the duty cycle wherein the maximum adjustment limit is plus or minus five percent of the baseline duty cycle.

Under a third technique, the electronic controller comprises a duty-cycle control module configured to adjust dynamically for one or more sampling intervals the duty cycle from a baseline duty cycle of approximately fifty percent within a maximum adjustment limit based on a look-up table, file or other data structure that defines a relationship between a duty cycle adjustment for each phase of the dual active bridge converter and a corresponding sampled magnitudes of the near-DC low frequency components of the first estimated line-to-line DC offset voltage, the sampled second estimated line-to-line DC offset voltage, and third estimated line-to-line DC offset voltage.

Under a fourth technique, the electronic controller comprises a duty-cycle control module configured to adjust dynamically for one or more sampling intervals the duty cycle, such that the duty-cycle adjustment comprises decreasing the duty cycle of the low-side switch below approximately 50 percent duty cycle, while simultaneously increasing the duty cycle of the high-side switch above approximately 50 percent duty cycle for a corresponding phase of the primary inverter to attenuate any direct current or low frequency alternating current flowing between the primary winding and secondary winding of the transformer.

Under a fifth technique, the driver controls the semiconductor switches of the primary converter and the secondary converter based on a commanded current or target output current (e.g., constant current power mode, or constant voltage power mode are possible).

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The following is claimed:

1. A dual-active-bridge converter comprising:
   a primary converter having a plurality of primary switch pairs that operate at different phases or phase offsets with respect to each other; each primary switch pair comprising a first switched terminal of low-side semiconductor switch coupled to a corresponding second switched terminal of high-side semiconductor switch at a primary alternating current node, each primary switch pair comprising the low-side semiconductor switch having a second switched terminal coupled to one terminal of a primary direct current bus; the high-side semiconductor switch having a first switched terminal coupled to another terminal of the primary direct current bus;
   a secondary converter having a plurality of secondary switch pairs that operate at different phases or phase offsets with respect to each other; each secondary switch pair comprising a first switched terminal of low-side semiconductor switch coupled to a corresponding second switched terminal of high-side semiconductor switch at an secondary alternating current node, each secondary switch pair comprising the low-side semiconductor switch having a second switched terminal coupled to one terminal of a secondary direct current bus; the high-side semiconductor switch having a first switched terminal coupled to another terminal of the secondary direct current bus;
   a first DC offset detector to measure a first observed DC offset line-to-line voltage, associated with the primary alternating current nodes, between a respective first phase and a respective second phase, wherein the first DC offset detector comprises a first preconditioner having a first low-pass filter for averaging over time or smoothing the magnitudes of near DC, low frequency alternating current components in the first observed DC offset line-to-line voltage;
   a second DC offset detector to measure a second observed DC offset line-to-line voltage, associated with the primary alternating-current nodes, between the respective second phase and a respective third phase, wherein the second DC offset detector comprises a second preconditioner having a second low-pass filter for averaging over time or smoothing the magnitudes of near DC, low frequency alternating current components in the second observed DC offset line-to-line voltage;
   a transformer coupled between the primary alternating-current node and the secondary alternating current node; and
   an electronic controller configured to provide control signals to the control terminals of the semiconductor switches of the primary converter and the secondary converter based on a commanded current or target output current; the electronic controller configured to adjust the duty cycle through a duty cycle adjustment, between a respective pairs of semiconductor switches of the primary converter and second converter based on reducing or minimizing one or more of the time-averaged magnitudes of, near DC low frequency AC components in first estimated line-to-line DC offset voltage and the second estimated line-to-line DC offset voltage.

2. The dual active-bridge converter according to claim 1 wherein the first low-pass filter comprises a second-order or third-order low-pass filter and wherein the second low-pass filter comprises a second-order or third-order low pass filter.

3. The dual active-bridge converter according to claim 1 wherein each cut-off frequency of the first low pass filter and the second low pass filter are equal to or less than approximately 45 Hertz.

4. The dual active bridge converter according to claim 1 wherein:
   the first preconditioner comprises a first voltage follower stage coupled to the respective first low-pass filter;

the second preconditioner comprises a second voltage follower stage coupled to the respective second low-pass filter; and a first differential amplifier of the first DC offset detector, is coupled to the first voltage follower stage and the second voltage follower stage.

5. The dual active bridge converter according to claim 4 further comprising:

a first analog-to-digital converter coupled to an output of the first differential amplifier;

the electronic controller configured to receive the digital output of the first analog-to-digital converter.

6. The dual active bridge converter according to claim 4 further comprising:

a supplemental low-pass filter coupled to an output of the first differential amplifier to attenuate noise and alternating-current ripple in the first estimated line-to-line DC offset voltage;

a first analog-to-digital converter coupled to an output of the supplemental low-pass filter; and the electronic controller configured to receive the digital output of the first analog-to-digital converter.

7. The dual active bridge converter according to claim 1 wherein each of the second DC offset detector comprises:

a second low-pass filter configured to receive the second alternating current voltage at a second alternating current node for a second respective phase;

a third low-pass filter configured to receive the third alternating current voltage a third alternating current node for a third respective phase;

a second voltage follower stage coupled to an output of the respective second low-pass filter;

a third voltage follower stage coupled to an output of the respective third low-pass filter;

a second differential amplifier coupled to the outputs of the second low-pass filter and the third low-pass filter, the second differential amplifier providing the second line-to-line DC offset voltage.

8. The dual active bridge converter according to claim 7 further comprising:

a supplemental low-pass filter coupled to an output of the second differential amplifier to attenuate noise and alternating-current ripple in the second estimated line-to-line DC offset voltage;

a second analog-to-digital converter coupled to an output of the supplemental low-pass filter; and the electronic controller configured to receive the digital output of the second analog-to-digital converter.

9. The dual active bridge converter according to claim 1 further comprising:

a third DC offset detector to measure a third observed DC offset line-to-line voltage associated with the primary alternating current nodes between the respective first phase and the respective third phase;

the transformer being coupled between the primary alternating-current nodes and corresponding secondary alternating-current nodes;

the electronic controller configured to adjust the duty cycle through a duty cycle adjustment, between a respective pairs of semiconductor switches of the primary converter and second converter based on reducing or minimizing one or more of the time-averaged magnitudes of, near DC low frequency AC components in first estimated line-to-line DC offset voltage, the second estimated line-to-line DC offset voltage and third estimated line-to-line DC offset voltage.

10. The dual active bridge converter according to claim 1 wherein the electronic controller comprises a duty-cycle control module configured to adjust dynamically for one or more sampling intervals the duty cycle from a baseline duty cycle of approximately fifty percent by a maximum adjustment limit based on reducing or minimizing one or more of the, time-averaged magnitudes of, near DC low frequency AC components in the sampled first estimated line-to-line DC offset voltage and the sampled second estimated line-to-line DC offset voltage.

11. The dual active bridge converter according to claim 10 wherein the maximum adjustment limit is plus or minus five percent of the baseline duty cycle.

12. The dual active bridge converter according to claim 1 wherein the electronic controller comprises a duty-cycle control module configured to adjust dynamically for one or more sampling intervals the duty cycle from a baseline duty cycle of approximately fifty percent within a maximum adjustment limit based on a look-up table, file or other data structure that defines a relationship between a duty cycle adjustment for each phase of the dual active bridge converter and a corresponding sampled magnitudes of the near-DC low frequency components of the first estimated line-to-line DC offset voltage, the sampled second estimated line-to-line DC offset voltage, and third estimated line-to-line DC offset voltage.

13. The dual active bridge converter according to claim 1 wherein the duty-cycle adjustment comprises decreasing the duty cycle of the low-side switch below approximately 50 percent duty cycle, while simultaneously increasing the duty cycle of the high-side switch above approximately 50 percent duty cycle for a corresponding phase of the primary inverter to attenuate any direct current or low frequency alternating current flowing between the primary winding and secondary winding of the transformer.

* * * * *